(12) United States Patent
Fang et al.

(10) Patent No.: US 7,914,913 B2
(45) Date of Patent: Mar. 29, 2011

(54) $AL_2O_3$ CERAMIC TOOL WITH DIFFUSION BONDING ENHANCED LAYER

(75) Inventors: X. Daniel Fang, Brentwood, TN (US); David J. Wills, Brentwood, TN (US); Gilles Festeau, Ferney Voltaire (FR)

(73) Assignee: TDY Industries, Inc., Pittsburgh, PA (US)

( * ) Notice: Subject to any disclaimer, the term of this patent is extended or adjusted under 35 U.S.C. 154(b) by 549 days.

(21) Appl. No.: 11/596,267

(22) PCT Filed: May 5, 2005

(86) PCT No.: PCT/US2005/015720
§ 371 (c)(1),
(2), (4) Date: Nov. 1, 2007

(87) PCT Pub. No.: WO2005/121388
PCT Pub. Date: Dec. 22, 2005

(65) Prior Publication Data
US 2008/0057327 A1 Mar. 6, 2008

(51) Int. Cl.
*B32B 9/00* (2006.01)

(52) U.S. Cl. ........ 428/701; 428/699; 428/697; 428/216; 428/336; 407/117; 407/119

(58) Field of Classification Search .................. 428/701, 428/699, 698, 697, 336, 216; 407/117, 119
See application file for complete search history.

(56) References Cited

U.S. PATENT DOCUMENTS

| | | | |
|---|---|---|---|
| 3,640,689 A | 2/1972 | Glaski et al. | |
| 3,854,971 A | 12/1974 | Conley et al. | |
| 3,900,592 A | 8/1975 | Kennedy et al. | |
| 4,101,703 A | 7/1978 | Schintlmeister | |
| 4,268,569 A | 5/1981 | Hale | |
| 4,269,899 A | 5/1981 | Fuyama et al. | |
| 4,282,289 A | 8/1981 | Kullander et al. | |
| 4,399,168 A | 8/1983 | Kullander et al. | |
| 4,409,003 A | 10/1983 | Sarin et al. | |
| 4,463,062 A | 7/1984 | Hale | |
| 4,490,191 A | 12/1984 | Hale | |
| 4,497,874 A | 2/1985 | Hale | |
| 4,501,786 A | 2/1985 | Hale | |

(Continued)

FOREIGN PATENT DOCUMENTS

EP 0186831 A2 12/1985

(Continued)

OTHER PUBLICATIONS

U.S. Appl. No. 12/400,007 filed Mar. 9, 2009.

(Continued)

*Primary Examiner* — Gwendolyn Blackwell
(74) *Attorney, Agent, or Firm* — K & L Gates LLP; Patrick J. Viccaro; John E. Grosselin, III

(57) ABSTRACT

The present invention relates to ceramic cutting tools, such as, a aluminum oxide with zirconium oxide ceramic cutting tool with diffusion bonding enhanced layer and CVD coatings, particularly useful for machining modern metal materials. The method comprises a chemical reaction with a mixture including nitrogen and aluminum chloride introduced to form a diffusion bonding enhanced layer between the ceramic substrate and the CVD coatings. Thus formed diffusion bonding is highly adherent to the aluminum oxide with zirconium oxide ceramic substrate and significantly enhances the CVD coating properties, and thus improving the machining performance in terms of the tool life of zirconium-based aluminum oxide with zirconium oxide ceramic cutting tools.

17 Claims, 7 Drawing Sheets

U.S. PATENT DOCUMENTS

| | | | |
|---|---|---|---|
| 4,525,415 A | 6/1985 | Porat | |
| RE32,111 E | 4/1986 | Lambert et al. | |
| 4,608,098 A | 8/1986 | Hale | |
| 4,610,931 A | 9/1986 | Nemeth et al. | |
| 4,619,866 A | 10/1986 | Smith et al. | |
| 4,714,660 A | 12/1987 | Gates, Jr. | |
| 4,830,886 A | 5/1989 | Cho et al. | |
| 5,204,167 A | 4/1993 | Saijo et al. | |
| 5,232,318 A | 8/1993 | Santhanam et al. | |
| 5,236,740 A | 8/1993 | Peters et al. | |
| 5,325,747 A | 7/1994 | Santhanam et al. | |
| 5,336,292 A | 8/1994 | Weinl | |
| 5,364,209 A | 11/1994 | Santhanam et al. | |
| 5,368,938 A | 11/1994 | Holtz et al. | |
| 5,370,944 A | 12/1994 | Omori et al. | |
| 5,372,873 A | 12/1994 | Yoshimura et al. | |
| 5,374,471 A | 12/1994 | Yoshimura et al. | |
| 5,380,408 A | 1/1995 | Svensson | |
| 5,415,674 A | 5/1995 | Feistritzer | |
| 5,419,927 A | 5/1995 | Dietrich | |
| 5,436,071 A | 7/1995 | Odani et al. | |
| 5,451,469 A | 9/1995 | Gustafson et al. | |
| 5,478,634 A | 12/1995 | Setoyama et al. | |
| 5,484,468 A | 1/1996 | Ostlund et al. | |
| 5,494,635 A | 2/1996 | Bennett | |
| 5,560,839 A | 10/1996 | Bennett | |
| 5,567,526 A | 10/1996 | Peters et al. | |
| 5,571,616 A | 11/1996 | Phillips et al. | |
| 5,624,766 A | 4/1997 | Moriguchi et al. | |
| 5,635,256 A | 6/1997 | Olson | |
| 5,674,620 A | 10/1997 | Puiia | |
| 5,700,518 A | 12/1997 | Lee | |
| 5,713,133 A | 2/1998 | Bhat | |
| 5,718,948 A | 2/1998 | Ederyd et al. | |
| 5,750,247 A | 5/1998 | Bryant et al. | |
| 5,786,069 A | 7/1998 | Ljungberg et al. | |
| 5,891,522 A | 4/1999 | Olson | |
| 5,900,288 A | 5/1999 | Kuhman | |
| 5,920,760 A | 7/1999 | Yoshimura et al. | |
| 5,958,569 A | 9/1999 | Leverenz et al. | |
| 6,056,999 A | 5/2000 | Narasimhan | |
| 6,080,477 A | 6/2000 | Narasimhan | |
| 6,214,247 B1 | 4/2001 | Leverenz et al. | |
| 6,358,428 B1 | 3/2002 | Leverenz et al. | |
| 6,447,890 B1 | 9/2002 | Leverenz et al. | |
| 6,447,896 B1 | 9/2002 | Augustine | |
| 6,827,975 B2 | 12/2004 | Leverenz et al. | |
| 6,929,851 B1 | 8/2005 | Leverenz et al. | |
| 6,939,607 B2 | 9/2005 | Kato et al. | |
| 2002/0054794 A1 | 5/2002 | Kato et al. | |
| 2002/0076284 A1 | 6/2002 | Kato | |
| 2005/0260454 A1 | 11/2005 | Fang et al. | |
| 2009/0186154 A1 | 7/2009 | Fang et al. | |

FOREIGN PATENT DOCUMENTS

| | | |
|---|---|---|
| EP | 0459865 B1 | 10/1995 |
| EP | 0678594 B1 | 10/1995 |
| EP | 1413648 B1 | 6/2005 |
| EP | 1198609 B2 | 10/2007 |
| GB | 1291387 | 10/1972 |
| GB | 1291388 | 10/1972 |
| JP | 56-9365 A | 1/1981 |
| JP | 60-127905 | 7/1985 |
| JP | 60-127905 A | 7/1985 |
| JP | 3-87368 A | 4/1991 |
| JP | 04-289002 A | 10/1992 |
| JP | 05-016031 A | 1/1993 |
| JP | 6-57429 A | 3/1994 |
| JP | 6-108254 | 4/1994 |

OTHER PUBLICATIONS

Office Action issued in U.S. Appl. No. 10/848,776 dated Sep. 7, 2006.
Office Action issued in U.S. Appl. No. 10/848,776 dated Mar. 6, 2007.
Office Action issued in U.S. Appl. No. 10/848,776 dated Nov. 29, 2007.
Notice of Panel Decision from Pre-Appeal Brief Review issued in U.S. Appl. No. 10/848,776 dated Sep. 13, 2007.
Notice of Allowance issued in U.S. Appl. No. 10/848,776 dated Jun. 20, 2008.
Notice of Allowance issued in U.S. Appl. No. 10/848,776 dated Dec. 10, 2008.
Levernez, Roy V., "A Look at the Hafnium Nitride Coatings", 2 pages, 1977.
Office Action issued in U.S. Appl. No. 12/403,894 dated Aug. 12, 2010.
Vuorinen, et al., "Interfacial characterization of chemically vapour deposited titanium carbide on cemented carbide", 1993, Elsevier Sequoia, pp. 73-82.
US 5,143,488, 09/1992, Santhanam et al. (withdrawn)

AL$_2$O$_3$ CERAMIC TOOL WITH DIFFUSION BONDING ENHANCED LAYER

BACKGROUND OF THE INVENTION

At the present time, most cutting inserts comprise substrates made from cemented carbides because cemented carbides have a high degree of toughness and good wear resistance. However, the use of cutting tools and cutting inserts ("ceramic tools") having ceramic substrates is increasing. These ceramic tools find use in a wide range of high-speed finishing operations and for the machining of difficult-to-machine materials at a high removal rate. The increase in use of ceramic tools may be due to improvements in alloyed ceramics and ceramic-matrix composites, as well as with the advances in ceramic processing technology. The ceramics used in cutting tools are typically inorganic, nonmetallic materials.

The production of ceramic tools typically involves the consolidation and sintering of powdered ceramics. Sintering provides the necessary densification of the consolidated powder and may optionally be performed under pressure. In pressureless sintering, the powder is first shaped into a green, or unsintered, body which may then be sintered to achieve the necessary densification. Hot pressing of ceramics involves heating along with simultaneous uniaxial pressing of the powder in a die. Although hot-pressed ceramics are more expensive, they may be prepared with a finer grain size, a higher density and higher transverse rupture strength than cold-pressed materials.

The ceramics currently used in cutting tools are based either on aluminum oxide (alumina, Al$_2$O$_3$) or silicon nitride (Si$_3$N$_4$). Other ceramics, such as, magnesia, yttria, zirconia, chromium oxide, and titanium carbide may be used as additives to aid sintering or to form alloyed ceramics with improved thermo-mechanical properties.

A ceramic tool comprising an aluminum oxide substrate may be used in metal machining with high cutting speed due to the chemical inertness and great strength of the aluminum oxide substrate. Commercially significant aluminum oxide ceramic tools were basically fine grained (less than 5 μm) Al$_2$O$_3$ with magnesia added as a sintering aid and grain growth inhibitor. Aluminum oxide ceramics may also be alloyed with suboxides or titanium or chromium to form solid solutions. The three main commercially available aluminum oxide based tool materials are Al$_2$O$_3$/Ti, Al$_2$O$_3$/ZrO$_2$, and Al$_2$O$_3$ reinforced with silicon carbide (SiC) whiskers. Other Al$_2$O$_3$ base ceramics may have additives of TiN, TiB$_2$, Ti(C, N), and Zr(C,N).

Alumina-zirconia (Al$_2$O$_3$/ZrO$_2$) is an alloyed ceramic. The addition of zirconium oxide increases the higher fracture toughness and thermal shock resistance of an aluminum oxide substrate. The toughening of aluminum oxide with zirconium oxide exploits a specific crystallographic change, a martensitic type transformation, that results from an energy absorbing mechanism. The presence of metastable tetraorthoganol ZrO$_2$ provides the potential for transformation under stress into a stable monoclinic structure. The transformation acts as a stress absorber and prevents, even when cracks exist, further cracking.

Typically, the zirconia oxide particles are concentrated at the aluminum oxide grain boundaries. Although fracture is intergranular, the presence of these particles is believed to provide additional toughness before failure can occur by fracture. The three most popular compositions contain 10, 25, and 40 weight % (wt. %) ZrO$_2$ with the remainder being aluminum oxide. The 40 wt. % ZrO$_2$ composition is close to the eutectic concentration. The higher ZrO$_2$ compositions are less hard but tougher.

Cutting inserts may be coated to increase their resistance to wear. Single or multiple layers of coatings by chemical vapor deposition ("CVD") or physical vapor deposition ("PVD") may be applied to cutting tool. Titanium nitride (TiN), titanium carbon nitride (TiCN) and aluminum oxide (Al$_2$O$_3$) are among the most popular CVD coating materials for carbide-based cutting tools. Thin coatings (2 μm to 5 μm) on ceramic substrates have been developed primarily to limit chemical interactions between the tool and the work material and improve wear resistance. Examples of the very recent research efforts in applying the latest CVD coating technologies to ceramic cutting inserts include coated reinforced ceramic cutting tools, U.S. Pat. No. 6,447,896; coated silicon nitride ceramic cutting tools, United States Patent Application No. 2002/0076284; coated composite ceramic cutting inserts containing a hard phase dispersed with an alumina matrix phase, Published United States Patent Application No. 2002/0054794.

There is a need to develop new coating technologies for ceramic tools in order to further improve the wear and chemical resistance of ceramic tools to meet the ever-increasing demands on machining productivity.

SUMMARY OF THE INVENTION

In at least one aspect, the present invention is directed to cutting tools comprising a substrate, wherein the substrate comprises aluminum oxide and zirconium oxide and a diffusion bonding enhanced layer. The present invention is also directed to methods of forming a diffusion bonding enhanced layer on a substrate. A diffusion bonding enhanced layer increases the adherence of a wear resistant coating applied to the cutting tool. The diffusion bonding enhanced layer comprises the reaction products between a mixture comprising nitrogen and aluminum chloride, and at least the zirconium oxide present in the substrate.

In another aspect, the present invention is directed to a cutting insert comprising a substrate, wherein the substrate comprises aluminum oxide and zirconium oxide, an intermediate layer comprising nitrides of zirconium, zirconium oxide and nitrides of aluminum, and at least one wear resistant coating.

An embodiment of the method of the present invention comprises exposing a substrate to aluminum chloride and nitrogen, wherein the substrate comprises alumina and zirconia; and coating the substrate by at least one of chemical vapor deposition process or physical vapor deposition process. The substrate may comprise, by weight, from 0.5 to 45% zirconium oxide of the total weight of the substrate. The method may include exposing the substrate to a gaseous mixture comprising aluminum chloride and nitrogen.

The coating on the substrate may be applied by CVD or PVD, as well as other means. Each coating may independently comprise at least one of a metal carbide, a metal nitride, a metal silicon, and a metal oxide of a metal oxide of a metal selected from Groups IIIA, IVB, VB, and VIB of the periodic table, such as, but not limited to at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride plus tungsten carbide/carbon (AlTiN+WC/C), aluminum oxide (Al$_2$O$_3$), titanium diboride (TiB$_2$), tungsten carbide carbon (WC/C), chromium nitride (CrN) and aluminum chromium nitride (AlCrN).

The reader will appreciate the foregoing details and advantages of the present invention, as well as others, upon consideration of the following detailed description of embodiments of the invention. The reader also may comprehend such additional details and advantages of the present invention upon making and/or using embodiments within the present invention.

BRIEF DESCRIPTION OF THE DRAWINGS

The features and advantages of the present invention may be better understood by reference to the accompanying figures in which.

DETAILED DESCRIPTION OF THE PRESENT INVENTION

Figure 1:
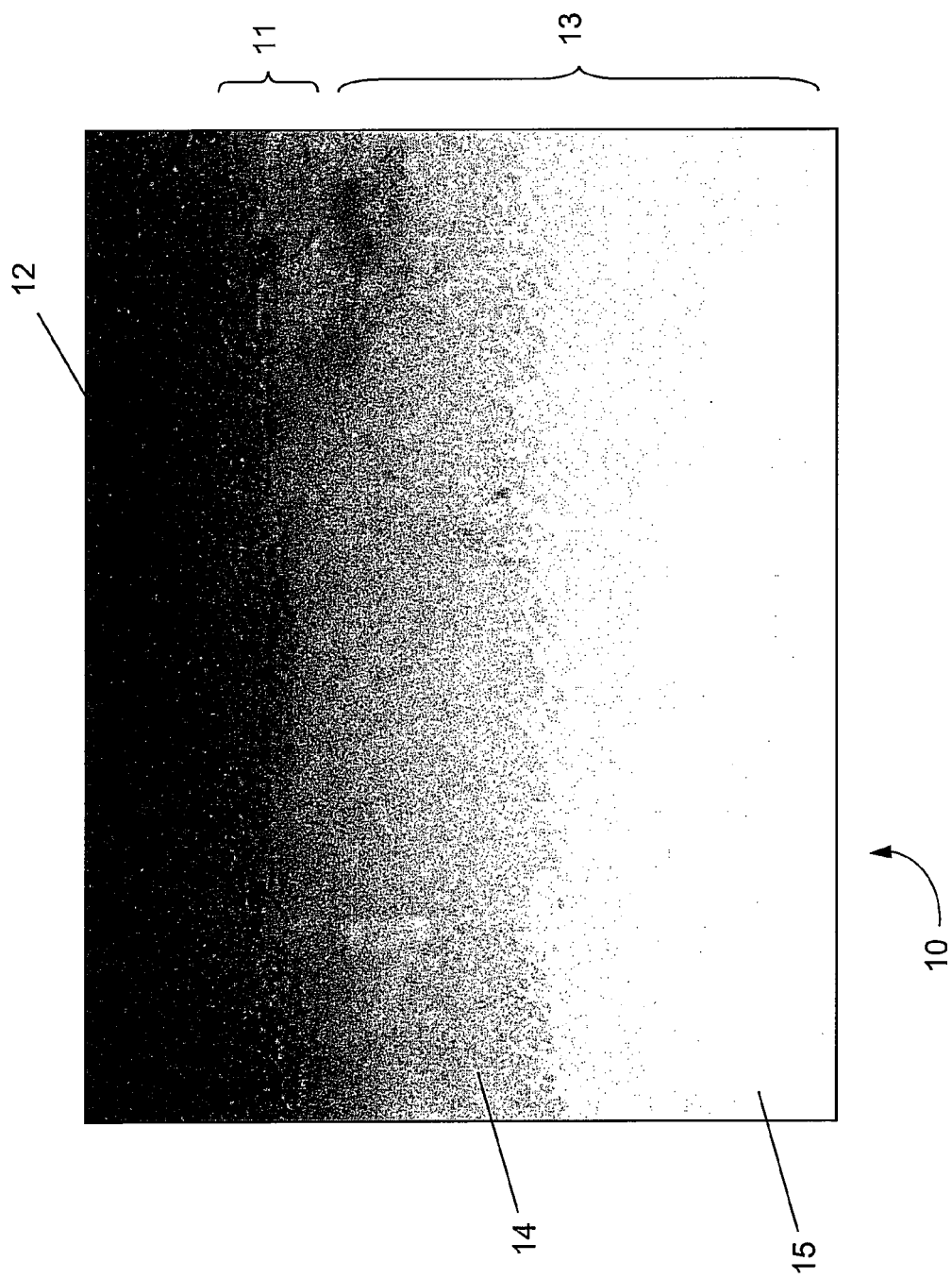
FIG. 1 is a photomicrograph taken at 1000× magnification of a prepared cross-section showing the diffusion bonding enhanced layer formed on the surface of the Al$_2$O$_3$/ZrO$_2$ ceramic substrate.

The present invention relates cutting tools comprising a substrate comprising aluminum oxide and zirconium oxide, and a diffusion bonding enhanced layer. The diffusion bonding enhanced layer results from the reaction between reagents and at least one of the zirconium oxide and aluminum oxide in the substrate. The diffusion bonding enhanced layer may comprise nitrides of zirconium and nitrides of aluminum and the presence of these compounds enhances the adhesion of subsequent coatings. Therefore, the diffusion bonding enhanced layer may be used as an intermediate layer between the substrate and a wear resistant coating. The presence of a diffusion bonding enhanced layer may significantly improve the tool life of coated Al$_2$O$_3$ ceramic cutting inserts. An embodiment of the present invention results in a chemical reaction between at least one of the aluminum oxide and the zirconium oxide of the substrate and a mixture of nitrogen (N$_2$) and aluminum chloride (AlCl$_3$) in a surface region. The reaction may be between a gaseous mixture of N$_2$ and AlCl$_3$ and the components of the substrate. Single or multiple wear resistant coatings may be applied by a known coating means, including, but not limited to, CVD and PVD.

The thickness of the diffusion bonded enhanced layer depends on the diffusion of the reactants into the substrate. Diffusion is the process by which molecules intermingle as a result of their kinetic energy of random motion, or in other words, it is the result of random motion of the individual atoms in a surface region of the substrate, i.e. the aluminum oxide with zirconium oxide ceramic substrate in this invention. At a relatively high temperature, the rate of diffusion increases and, therefore, certain reactants may be chemically bonded to a surface region at a certain depth into the substrate. The diffusion bonding enhanced layer does not intend to function as a wear resistant coating, rather as an intermediate layer between the ceramic substrate and the refractory metals-based CVD coatings to increase adherence. Experiments have shown consistently that the direct application of CVD coatings on the aluminum oxide with zirconium oxide ceramic substrate often does not result in good adhesion. The coatings typically peel and crack during the machining process resulting in a short service life of the ceramic tool.

The diffusion bonding enhanced layer provided in this invention may be relatively uniform, stable and highly adherent layer to the ceramic substrate. It is believed that the diffusion bonding enhanced layer comprises the products of a reaction between nitrogen and aluminum chloride, and the zirconium oxide present in the substrate. The thickness of the diffusion bonding enhanced layer may be controlled by adjusting at least one of the temperature, pressure, reaction time, surface roughness of the substrate, as well as other parameters to produce the desired thickness of the coating.

Embodiments of the cutting tool of the present invention comprise a substrate comprising aluminum oxide and zirconium oxide. Typically, such presently commercially available substrates comprise, by weight, from 0.5 to 45% zirconium oxide. In certain embodiments, such as where a harder substrate may be desired, the substrate may comprise, by weight, from 0.5 to 26% zirconium oxide or preferably, from 2 to 26% zirconium oxide, or more preferably from 9 to 11% zirconium oxide.

Embodiments of the cutting tool may comprise single or multiple wear resistant or chemical resistant coatings, together referred to herein as "wear resistant coatings." The single or multiple wear resistant coatings on a diffusion enhanced bonding layer as a bonding interface intermediate the first wear resistant coating and coatings and the substrate, results in enhanced adhesive performance of coating and the aluminum oxide with zirconium oxide ceramic substrate is enhanced. The cutting tool may comprise any coating capable of being deposited by CVD or PVD. More particularly, the wear resistant coatings may independently comprise at least one of a metal carbide, a metal nitride, a metal carbonitride, a metal silicon and a metal oxide of a metal selected from groups IIIA, IVB, VB, and VIB of the periodic table or combination thereof, such as, but not limited to, titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride plus tungsten carbide/carbon (AlTiN+WC/C), aluminum oxide (Al$_2$O$_3$), titanium diboride (TiB2), tungsten carbide carbon (WC/C), chromium nitride (CrN) and aluminum chromium nitride (AlCrN). A typical commercial multilayer coating for a cutting tool may comprise, for example, a first wear resistant coating of titanium nitride, a second wear resistant coating of titanium carbonitride, and the third wear resistant coating of titanium nitride.

The thickness of each wear resistant coating may be any thickness desired for the specific machining application or the material to be machined. The total thickness of the coating on the surface of the substrate will typically be from about 1 to about 20 micrometers or more typically from 1 to 5 micrometers. Individual wear resistant coatings, typically, may have a thickness of from 0.25 to 2 micrometers.

Embodiments of the cutting tools of the invention may also comprise a substrate, wherein the substrate comprises aluminum oxide and zirconium oxide, an intermediate layer comprising nitrides of zirconium, zirconium oxide and nitrides of aluminum, and at least one wear resistant coating.

The present invention also relates to a method of coating a cutting tool. Embodiments of the method comprise exposing an substrate to aluminum chloride and nitrogen, wherein the substrate comprises aluminum oxide and zirconium oxide, and coating the substrate by at least one process selected from CVD and PVD. Embodiments of the method of the present invention include a substrate comprising, by weight, from 0.5 to 45% zirconium oxide. In certain embodiments where a harder substrate may be desired, the substrate comprises, by weight, from 0.5 to 26% zirconium oxide or preferably, by weight, from 2 to 26% zirconium oxide, or more preferably, by weight, from 9 to 11% zirconium oxide.

The substrate may be exposed to a gaseous mixture comprising aluminum chloride and nitrogen. The gaseous mixture may comprise an aluminum chloride concentration from 25% to 99% by weight or more preferably, from 75% to 99% by weight. The gaseous mixture may contain other components that are inert or essentially inert, by "essentially inert" is meant that the additional components do not interfere with formation of a diffusion bonding enhanced layer. When a gaseous mixture comprising aluminum chloride and nitrogen is used to form the diffusion bonding enhanced layer any pressure may be used although higher pressures will allow more interaction between the gaseous phase and the solid phase. The pressure of gaseous mixture used in the diffusion process may be used to control the reaction for forming the diffusion enhanced layer. A higher pressure may promote a higher level of reactivity between the zirconium oxide and nitrogen. Therefore, to provide the appropriate control, it may be preferable to maintain a pressure from 200 millibar to 1500 millibar or even a pressure from 400 millibar to 1000 millibar.

Diffusion may occur in a solid at any temperature. Either the gaseous mixture or the substrate may be heated to increase the rate of diffusion. Higher temperatures may result in a higher rate of diffusion but the operating temperatures should not be so high as to cause any undesired changes in the solid substrate. Therefore, for substrates comprising aluminum oxide and zirconium oxide, it may be preferred that the gaseous mixture or the substrate is at a temperature from 50° C. to 1400° C. or from 50° C. to 1200° C. More narrow temperature ranges may be desired to maintain a commercially acceptable rate of diffusion and not affect the substrate, therefore, it may be desired to have a temperature of the gaseous mixture or the substrate from 500° C. to 1200° C. or more preferably from 1000° C. to 1200° C.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

EXAMPLES OF EMBODIMENTS OF THE INVENTION

The following examples demonstrate the formation of diffusion bonding enhanced layer on the substrate comprising aluminum oxide and zirconium oxide and the increased adherence of the wear resistant coatings on the substrate. The ceramic substrate of this example comprised in weight percentage, 90% $Al_2O_3$ and 10% ZrO2. The substrate had a density of 4.0 g/cm$^3$, a hardness of 1800 Hv, a toughness of 4.5 MN/m$^{3/2}$, and a heat transfer coefficient of 0.07 cal/cm.sec ° C.

The substrate was exposed to a gaseous mixture comprising aluminum chloride and nitrogen under a pressure of 500 millibar. The substrate was heated to a temperature of approximately 1020° C. The ratio of $AlCl_3/N_2$ in the gaseous mixture was approximately 7.

FIG. 1 is a photomicrograph taken at 1000× magnification of a prepared cross-section of a cutting tool 10 of the present invention at a perspective view showing the edge 11 between the top 12 and the cross-sectional face 13. The diffusion bonding enhanced layer 14 is clearly shown on the substrate 15 after exposure to the gaseous mixture. As may be seen in FIG. 1, the diffusion bonding enhanced layer 14 is formed evenly across the surface of the substrate 15. The thickness of the diffusion-bonding layer 14 on the substrate 15 of FIG. 1 is about half micrometer (0.5 micrometer).

Figure 2A:
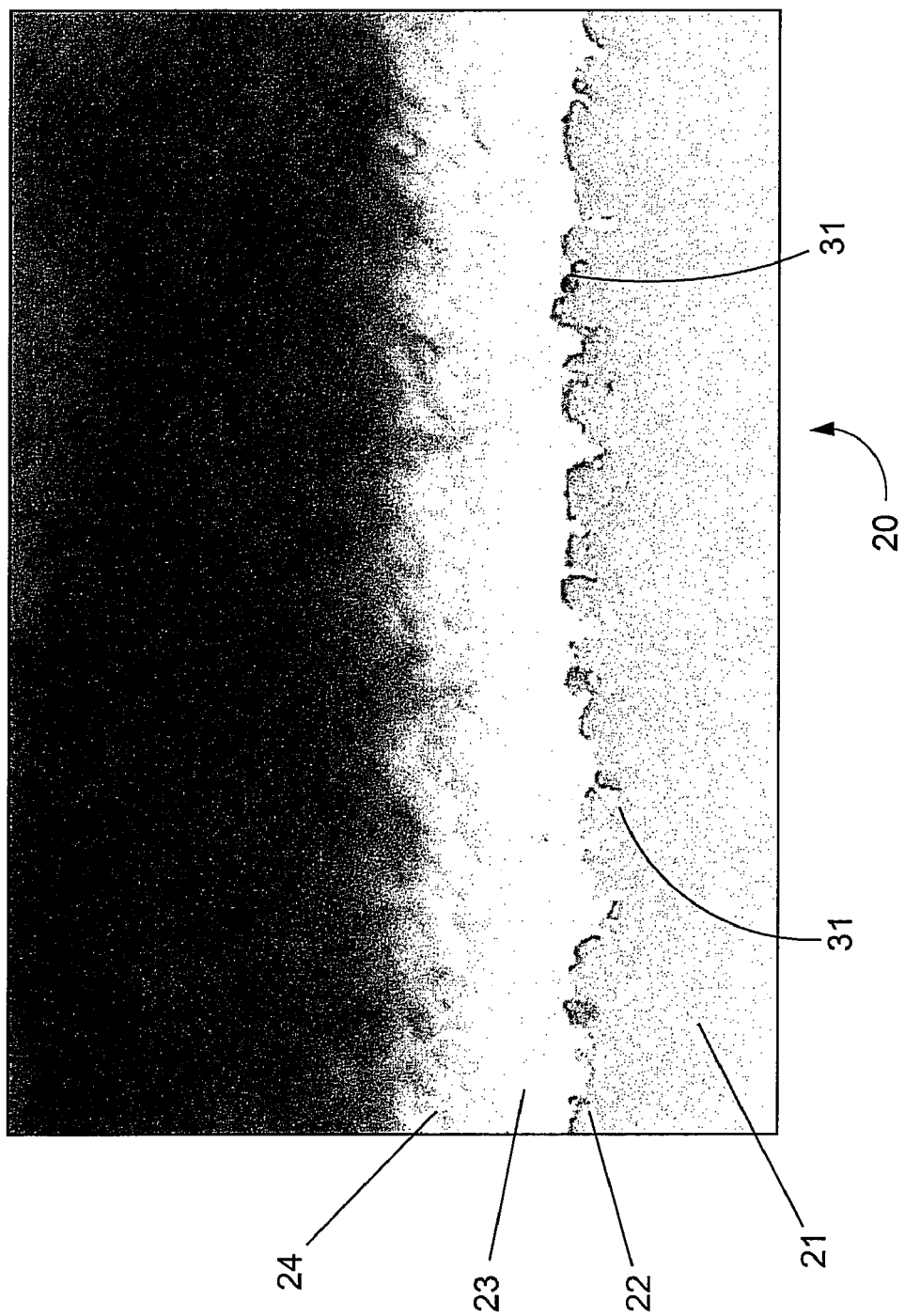
FIGS. 2A and 2B are photomicrographs taken at 1000× magnification for comparison of a CVD coated Al$_2$O$_3$/ZrO$_2$ ceramic substrate without a diffusion bonding enhanced layer (FIG. 2A) and a CVD coated Al$_2$O$_3$/ZrO$_2$ ceramic substrate with a diffusion bonding enhanced layer (FIG. 2B)
Figure 2B:
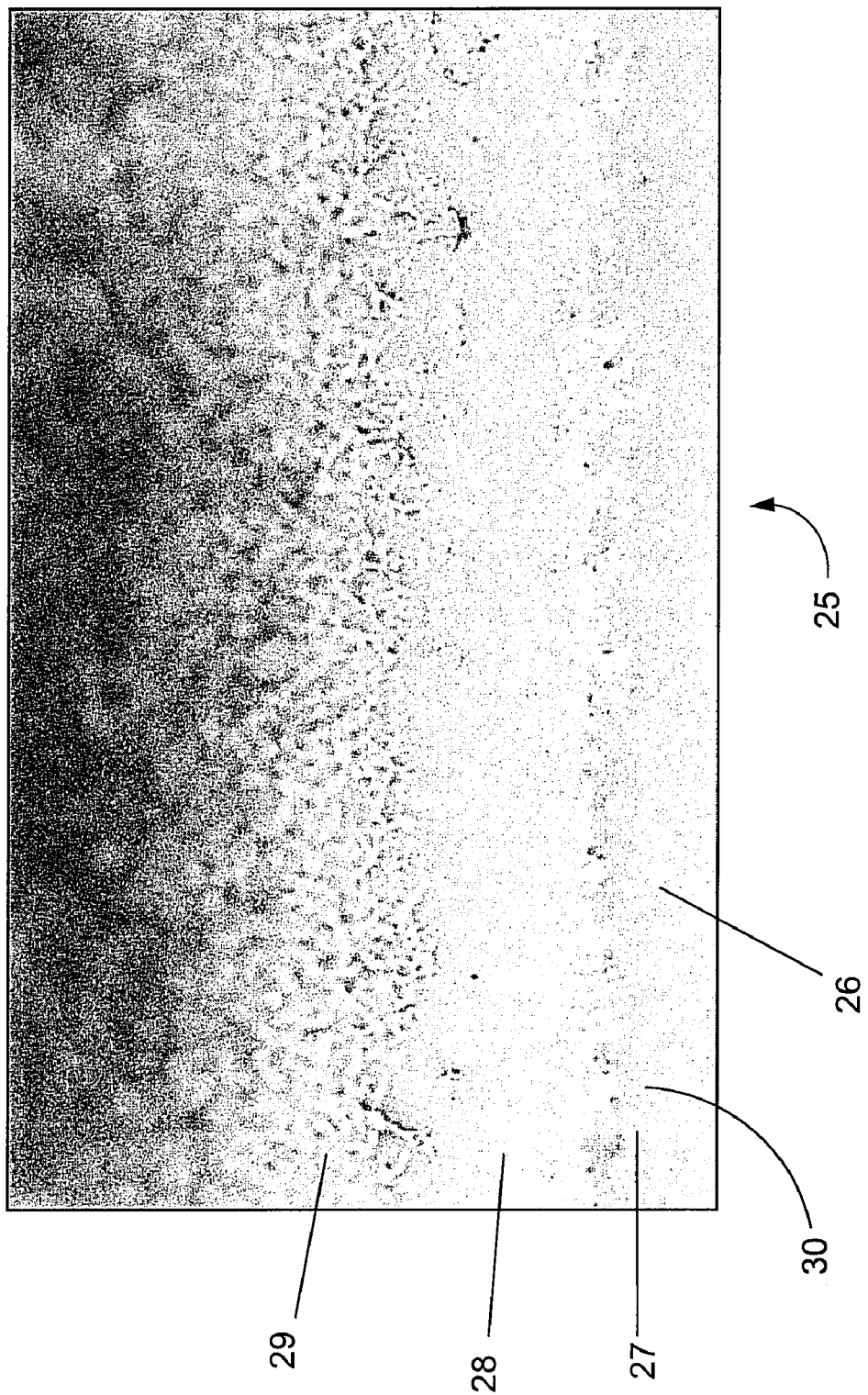

FIGS. 2A and 2B are photomicrographs taken at a magnification of 1000× of cross-sections of coated $Al_2O_3/ZrO_2$ ceramic substrate on which multiple wear resistant coatings were applied. FIG. 2A shows a photomicrograph of a cross-section of a coated ceramic substrate 20 having a first coating of TiN 22, a second coating of TiCN 23, and a third coating of TiN 24 applied directly on the substrate 21 without an intermediate diffusion bonding enhanced layer. FIG. 2B shows a photomicrograph of a cross-section of a coated ceramic substrate 25 with a diffusion bonding enhanced layer 30 between the first coating of TiN 27 coating and the substrate 26. The coated ceramic substrate 25 also has a second coating of TiCN 28 and a third coating of TiN 29. As may be seen in FIG. 2A, the first coating of TiN 22 neither adheres well nor distributes uniformly across the $Al_2O_3/ZrO_2$ ceramic substrate 21, the poor adherence may be evidenced by the dark areas 31 of the photomicrograph between the first coating of TiN 22 and the substrate 21. In contrast, the diffusion bonding enhanced layer 30 has good adherence and uniform distribution on both the first coating of TiN 27 and the substrate 26. The multiple coatings shown in both substrates 20 and 25 of FIGS. 2A and 2B are TiN—TiCN—TiN all deposited by CVD with a total thickness of 3 micrometers The diffusion bonding enhanced layer formed on the base $Al_2O_3/ZrO_2$ ceramic substrate 26 may be composed of various chemical elements or compounds, including zirconium nitride, zirconium oxide, and aluminum nitride, that are melted together in a fashion to produce a uniform distribution of the mixed metals.

Testing of Coated Cutting Tools

Scratch Test

Figure 3A:
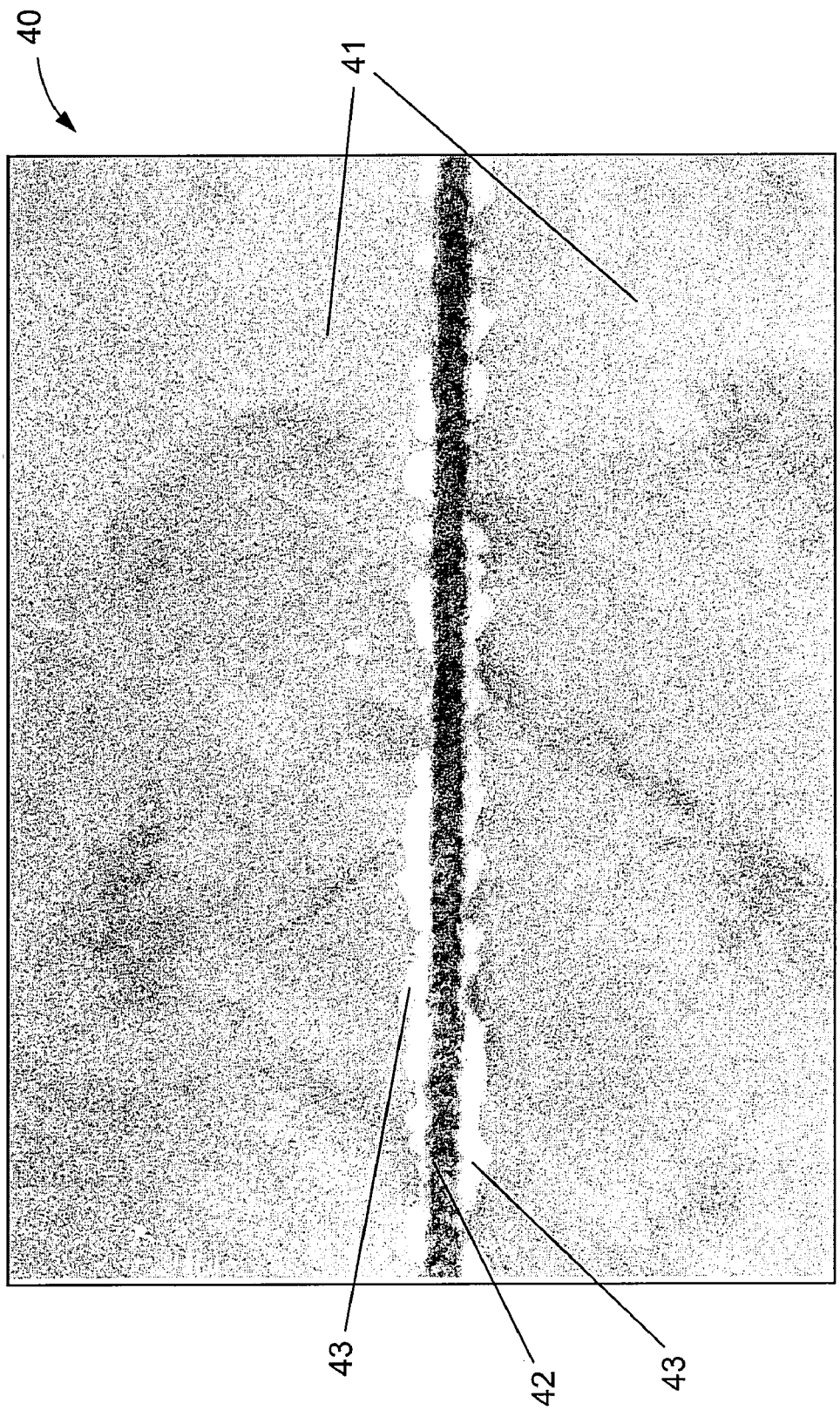
FIGS. 3A and 3B are photomicrographs of Al$_2$O$_3$/ZrO$_2$ ceramic cutting inserts after scratch tests were performed under a constant load of 10 kg on the CVD coatings of the two Al$_2$O$_3$/ZrO$_2$ ceramic cutting inserts, one cutting insert was prepared without a diffusion bonding enhanced layer (FIG. 3A) and the other cutting insert was prepared with diffusion bonding enhanced layer (FIG. 3B)
Figure 3B:
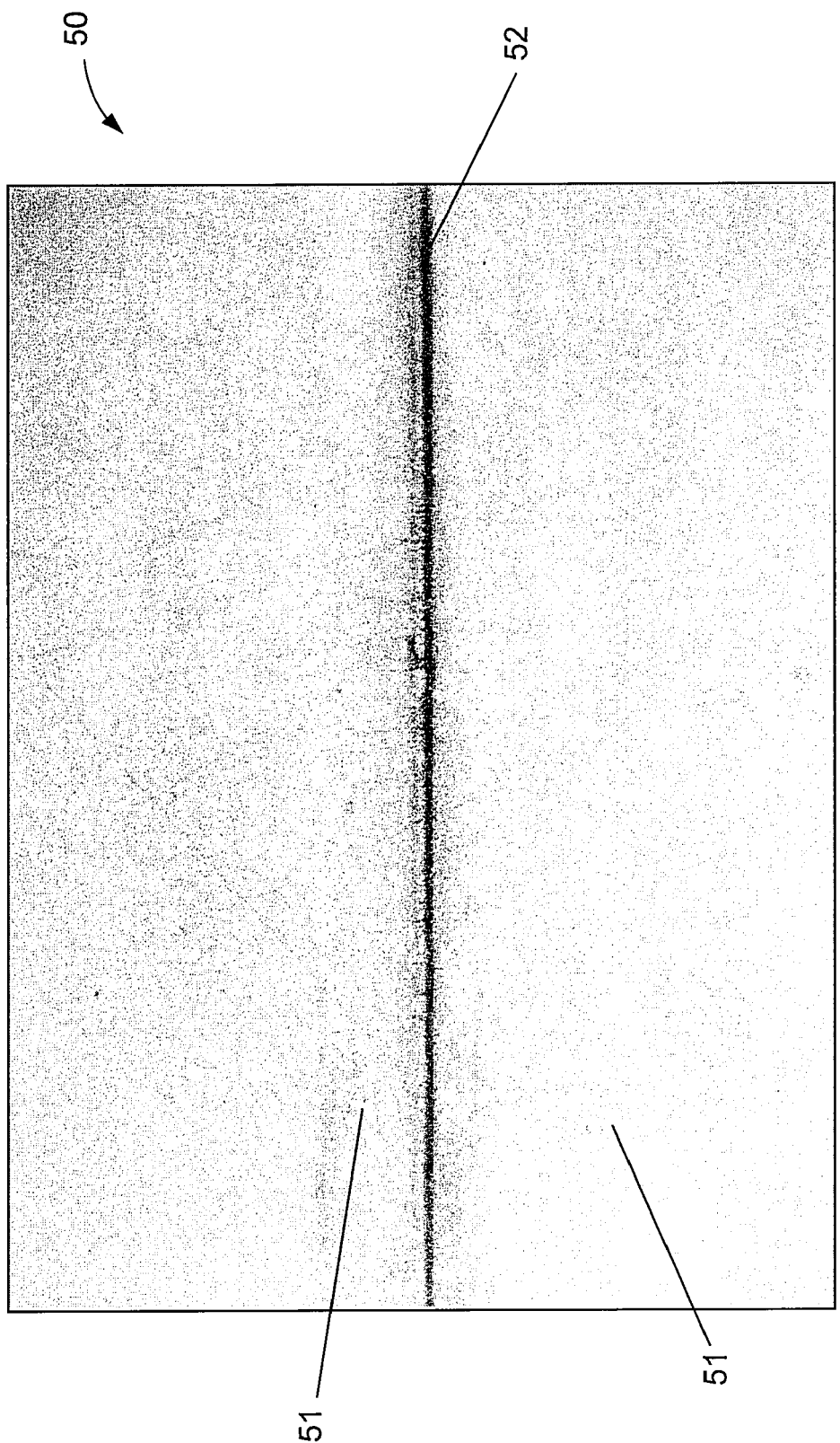

Performance tests were conducted to determine whether a cutting tool comprising a diffusion bonding enhanced layer intermediate to the substrate and the first wear resistant coating would provide a strong adherence for the CVD or PVD coatings (single or multiple layers). Two cutting tools were prepared one with a multiple wear resistant coatings applied directly to the substrate and a second with a diffusion enhanced bonding layer intermediate to the substrate and the multiple wear resistant coatings formed by the method described above. Both cutting inserts were similarly coated with TiN—TiCN—TiN with three micrometers in thickness by CVD. FIG. 3A and FIG. 3B are photographs of each of the coated ceramic substrates after scratch tests were performed under a constant load of 10 kg. The cutting insert 40 of FIG. 3A does not comprise a diffusion bonding enhanced layer and the cutting insert 50 of FIG. 3B does comprise the diffusion bonding enhanced layer. As shown in FIG. 3A, the CVD coatings 41 have peeled and chipped along the scratch mark 42 and the white ceramic surface 43 is exposed under the scratch pressure applied. In fact, the weak adhesion of the CVD coatings without a diffusion bonding enhanced bonding layer is also indicated by comparing the width scratch mark 42 in FIG. 3A with the narrow scratch mark 52 in FIG. 3B. The formation of a wider scratch 42 in FIG. 3A is because the wear resistant coatings 41 has a low resistance to chipping and peeling from the scratch load applied during the test (same 10-kg constant pressure for both cases). While the formation of the narrow scratch mark 52 in FIG. 3B is a result of the strong adherence of the CVD coatings 51 to the diffusion bonding enhanced layer between the $Al_2O_3/ZrO_2$ ceramic substrate and the CVD coatings applied. The scratch test clearly indicates that the diffusion bonding enhanced layer improves adherence of the CVD coatings on the $Al_2O_3/ZrO_2$ ceramic substrate.

Machining Tests

A series of comparative machining tests was carried out under various cutting conditions and with various work materials to demonstrate the advantages of a cutting tool comprising an intermediate diffusion bonding enhanced layer and multiple wear resistant coatings.

Case 1: Machining of the Iron Material for Automotive Parts

Three $Al_2O_3/ZrO_2$ ceramic cutting tools were selected for the comparative machining test—as shown in Table 1. All the cutting inserts have the same style and geometry, designated as SNEN120412, which denotes a square shape with an inscribed diameter of 12 mm, a thickness of 4.76 mm, and a corner nose radius of 1.20 mm according to the ISO standard. The cutting inserts of Case 1 have a single T-Land around the cutting edges.

TABLE 1

$Al_2O_3$ ceramic cutting inserts used in Comparative Test - Case 1

| I.D. | Coating Description |
|---|---|
| C1A | Uncoated |
| C1B | TiN CVD coated |
| C1C | TiN—TiCN—TiN CVD coated with diffusion enhanced bonding layer |

The machining tests of Case 1 were performed under the following cutting conditions:
Cutting speed=1600 feet per minute (480 meters per minute)
Feed rate=0.01 inch per revolution (0.25 mm per revolution)
Depth of cut=0.020 inch (0.5 mm)

Figure 4A:
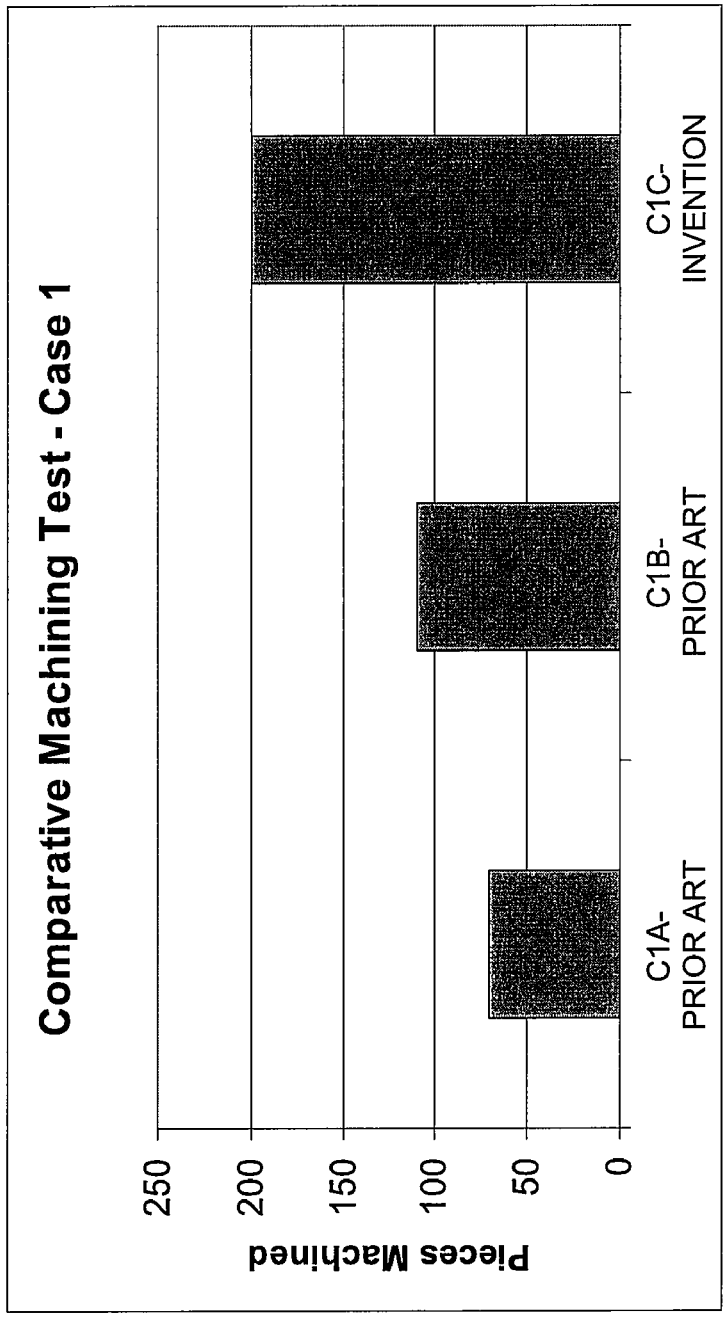
FIGS. 4A and 4B are graphs depicting the results of comparative machining tests (Case 1 and Case 2) that were carried out under different cutting conditions and with work materials in order to demonstrate the advantages of the ceramic cutting inserts comprising a substrate of aluminum oxide and zirconium oxide with diffusion bonding enhanced layer and wear-resistant coatings.

Insert designated C1B was coated directly on the substrate while insert designated C1C was coated accordingly to the method of the present invention, as described above. The test results are shown in FIG. 4A. It is clear that the cutting insert C1C (TiN—TiCN—TiN CVD coated) with the diffusion bonding enhanced layer demonstrated the best performance. The diffusion bonding enhanced layer resulted in more than 80% increase in tool life compared with the cutting insert C1B (TiN CVD coated), and a nearly 200% increase comparing with the uncoated cutting insert C1C.

Case 2: Machining of the Alloy Steels

Three $Al_2O_3/ZrO_2$ ceramic cutting tools were selected for the comparative machining test, as shown in Table 2. All the cutting inserts have the same style and geometry, designated as RCGX251200, which denotes a round shape with a diameter of 25 mm, a side clearance angle of 7 degrees, and a thickness of 12.7 mm, according to the ISO standard. The cutting inserts of Case 2 were prepared with double T-Lands around the cutting edges.

TABLE 2

$Al_2O_3$ ceramic cutting inserts used in Comparative Test - Case 2

| I.D. | Coating Description |
|---|---|
| C2A | TiN CVD coated |
| C2B | TiN CVD coated with diffusion enhanced bonding layer |
| C2C | TiN—TiCN—TiN CVD coated with diffusion enhanced bonding layer |

The machining tests of Case 2 were performed under the following test conditions:
Cutting speed=1000 feet per minute (305 meters per minute)
Feed rate=0.03-0.055 inch per revolution (0.76-1.40 mm per revolution)
Depth of cut=0.027-0.055 inch (0.69-1.40 mm)

Figure 4B:
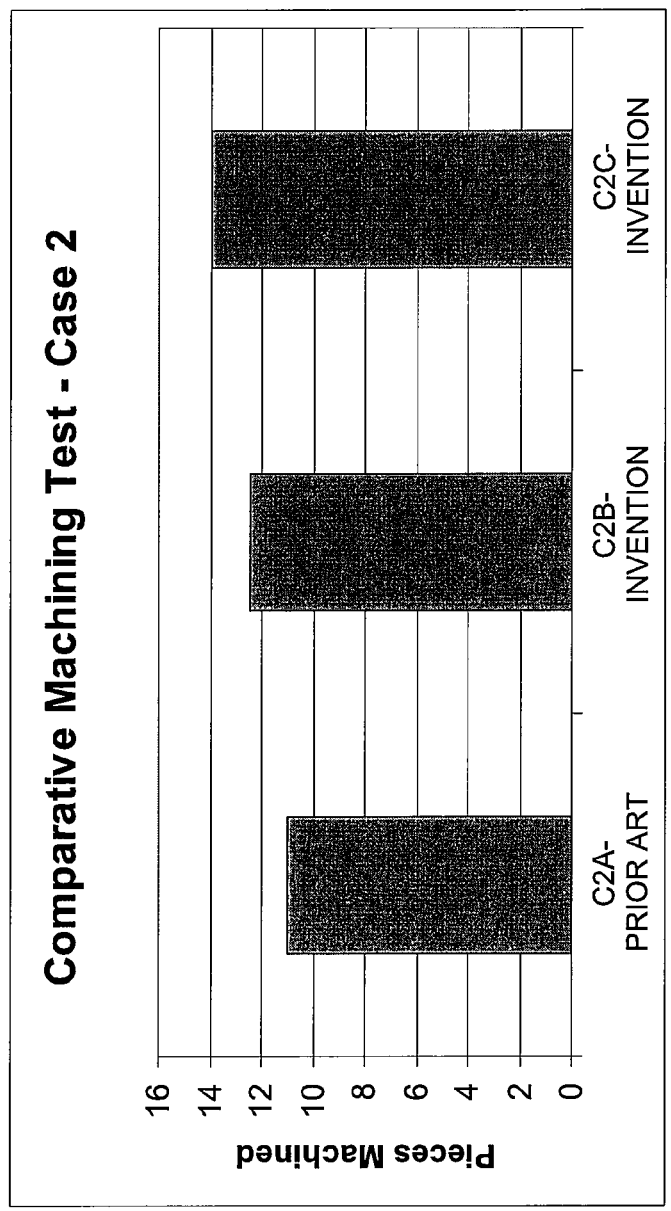

The machining test results of Case 2 are shown in FIG. 4B. It indicates clearly that both the cutting insert C2B with TiN CVD coating and the cutting insert C2C with TiN—TiCN—TiN CVD coating demonstrate better performance in terms of tool life than the cutting insert C2A with TiN CVD coating of the prior art.

It is to be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

We claim:

1. A cutting tool, comprising:
    a substrate, wherein the substrate comprises aluminum oxide and zirconium oxide; and
    a diffusion bonding enhanced layer, wherein the diffusion bonding enhanced layer comprises reaction products between the zirconium oxide and a gaseous mixture comprising nitrogen and aluminum chloride.

2. The cutting tool of claim 1, further comprising:
    a wear resistant coating.

3. The cutting tool of claim 1, wherein the thickness of the diffusion bonding enhanced layer ranges from 0.25 to 2.0 micrometers.

4. The cutting tool of claim 1, wherein the diffusion bonding enhanced layer comprises at least one of zirconium oxide, nitrides of zirconium, and nitrides of aluminum.

5. The cutting tool of claim 1, wherein the substrate comprises, by weight, from 0.5 to 45% zirconium oxide.

6. The cutting tool of claim 5, wherein the substrate comprises, by weight, from 0.5 to 26% zirconium oxide.

7. The cutting tool of claim 6, wherein the substrate comprises, by weight, from 2 to 26% zirconium oxide.

8. The cutting tool of claim 7, wherein the substrate comprises, by weight, from 9 to 11% zirconium oxide.

9. The cutting tool of claim 1, wherein the substrate comprises, by weight, from 0.3 to 35% zirconium oxide.

10. The cutting tool of claim 9, wherein the substrate comprises, by weight, from 6 to 20% zirconium oxide.

11. The cutting tool of claim 2, wherein the coating comprises at least one of a metal carbide, a metal nitride, a metal silicon, and a metal oxide of a metal selected from groups IIIA, IVB, VB, and VIB of the periodic table.

12. The cutting tool of claim 11, wherein the coating comprises at least one of titanium nitride (TIN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN).

13. The cutting tool of claim 2, further comprising a second wear resistant coating.

14. The cutting tool of claim 13, wherein the second wear resistant coating comprises at least one of a metal carbide, a metal nitride, a metal silicon, and a metal oxide of a metal selected from groups IIIA, IVB, VB, and VIB of the periodic table.

15. The cutting tool of claim 14, wherein the second wear resistant coating comprises at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN), and aluminum chromium nitride (AlCrN).

16. The cutting tool of claim 11, wherein the coating has a thickness from 1 to 20 micrometers.

17. The cutting tool of claim 14, wherein the first wear resistant coating and the second wear resistant coating have a total thickness from 1 to 20 micrometers.

* * * * *